(12) United States Patent
Tanaka et al.

(10) Patent No.: US 7,913,790 B2
(45) Date of Patent: Mar. 29, 2011

(54) STRUCTURE OF INSTRUMENT PANEL AREA OF VEHICLE

(75) Inventors: Kazuhiro Tanaka, Hiroshima (JP); Hitoshi Ochimizu, Higashihiroshima (JP); Shohei Kuroda, Hiroshima (JP); Go Aoyama, Hiroshima (JP); Hiroshi Kushida, Higashihiroshima (JP); Hideki Hayashi, Hiroshima (JP); Noriaki Igaki, Hiroshima (JP); Toshiteru Yoshimura, Aki-gun (JP)

(73) Assignees: Mazda Motor Corporation, Hiroshima (JP); Daikyonishikawa Corporation, Hiroshima (JP)

( * ) Notice: Subject to any disclaimer, the term of this patent is extended or adjusted under 35 U.S.C. 154(b) by 175 days.

(21) Appl. No.: 12/285,317

(22) Filed: Oct. 1, 2008

(65) Prior Publication Data

US 2009/0085338 A1 Apr. 2, 2009

(30) Foreign Application Priority Data

Oct. 2, 2007 (JP) ................................ 2007-258208
Oct. 2, 2007 (JP) ................................ 2007-258210

(51) Int. Cl.
*B60R 21/045* (2006.01)
*B62D 25/14* (2006.01)

(52) U.S. Cl. ............. 180/90; 280/750; 280/777; 296/70
(58) Field of Classification Search .................. 280/750, 280/751, 752, 777, 779; 296/70, 72, 73, 296/74, 187.05, 193.02; 74/492; 180/90
See application file for complete search history.

(56) References Cited

U.S. PATENT DOCUMENTS

| | | | | |
|---|---|---|---|---|
| 4,022,495 A * | 5/1977 | Pizzocri | ........................ | 280/750 |
| 5,758,920 A * | 6/1998 | Stephan | ......................... | 296/70 |
| 7,255,369 B2 * | 8/2007 | Matsumiya | .................... | 280/777 |
| 7,401,814 B2 * | 7/2008 | Yasuhara et al. | .............. | 280/775 |
| 7,497,472 B2 * | 3/2009 | Cymbal et al. | ................ | 280/779 |
| 7,611,165 B2 * | 11/2009 | Manwaring et al. | .......... | 280/775 |
| 2005/0082811 A1 * | 4/2005 | Matsumiya | .................... | 280/777 |
| 2005/0217913 A1 * | 10/2005 | Sakamoto | ........................ | 180/90 |

FOREIGN PATENT DOCUMENTS

| | | |
|---|---|---|
| DE | 195 35 556 C1 | 11/1996 |
| JP | 4-95548 | 8/1992 |
| JP | 05 054055 U | 7/1993 |
| JP | 2005 297795 A | 10/2005 |

OTHER PUBLICATIONS

Machine Translation of JP 05-54055U.*
Machine Translation of JP 2005-297795 A.*
European Search Report issued on Dec. 19, 2008 in corresponding European Patent Application 08165617.5.

* cited by examiner

*Primary Examiner* — Paul N Dickson
*Assistant Examiner* — Joseph Rocca

(57) ABSTRACT

A structure of a vehicle instrument panel area, which is capable of sufficiently ensuring a frontward displacement of a steering column adapted to be displaced frontwardly in response to an impact load applied thereto frontwardly, even under a condition that a column cover is disposed to overlap with a meter unit when viewed in an axial direction of the steering column. A meter unit 3 is attached to an instrument panel 1 through brittles portions 31*g*, 31*g*, 33*g*, 33*g*, in such a manner as to allow the attachment therebetween to be released when a column cover 5 is brought into contact with the meter unit 3.

6 Claims, 13 Drawing Sheets

STRUCTURE OF INSTRUMENT PANEL AREA OF VEHICLE

BACKGROUND OF THE INVENTION

1. Field of the Invention

The present invention relates to a structure of an instrument panel area of a vehicle equipped with a steering column having an impact-absorbing function, and belongs to the field of vehicle safety technology.

2. Description of the Background Art

In an instrument panel area of a vehicle, various instruments, such as a meter unit, are attached to an instrument panel. A steering column is arranged to penetrate through the instrument panel and extend in a rearward direction of the vehicle, and a steering wheel is attached to an interior-side end of the steering column. Further, a column cover is attached to a portion of the steering column located on a rearward side relative to the instrument panel.

The steering column is generally designed to be displaced in a frontward direction of the vehicle in response to an impact load induced by a secondary collision of an occupant against the steering wheel, wherein the steering column is arranged to penetrate through a position below the meter unit on the instrument panel, and the steering cover is disposed to overlap with the meter unit when viewed in an axial direction of the steering column, depending on a type of vehicle. In this case, if the column cover is displaced in the frontward direction of the vehicle together with the steering column, it will be brought into contact with (i.e., hit against) the meter unit, and thereby the steering column is likely to be hindered from its further frontward displacement.

As countermeasures against this problem, for example, JU04-095548A (hereinafter referred to as "Patent Document 1") discloses a structure comprising a push-up portion provided in a bottom of a meter unit and adapted to receive a knee of an occupant moved frontwardly by an impact load, and respondingly push the meter unit upwardly, so as to avoid interference (contact) between a column cover and the meter unit to allow a frontward displacement of a steering column.

In the structure disclosed in the Patent Document 1, the steering column is positioned to incline downwardly toward a front portion thereof, and adapted to be displaced along an axial direction thereof, i.e., frontwardly and obliquely downwardly. Differently, in some actual vehicles, the steering column is adapted to be displaced frontwardly and approximately horizontally while maintaining the inclined posture thereof. In the latter case, it is necessary to pushingly displace the meter unit up to a fairly high position in order to avoid the interference between the meter unit and the column cover, and such a need is likely to be not satisfied only by an upward displacement based on the push-up portion disclosed in the Patent Document 1. Moreover, even in the former case where the steering column is adapted to be displaced along the axial direction, if an inclination angle of the steering column is relatively small, the problem about the interference between the column cover and the meter unit occurs to a greater or lesser extent.

SUMMARY OF THE INVENTION

In view of the above problem, it is an object of the present invention to provide a structure of a vehicle instrument panel area, which is capable of sufficiently ensuring a frontward displacement of a steering column adapted to be displaced frontwardly in response to an impact load applied thereto frontwardly, even under a condition that a column cover is disposed to overlap with a meter unit when viewed in an axial direction of the steering column.

In order to achieve this object, the present invention provides a structure of an instrument panel area of a vehicle, which comprises an instrument panel having a meter unit attached thereto, a steering column arranged to penetrate through a position below the meter unit attached to the instrument panel, and extend in a rearward direction of the vehicle, a column cover attached to a portion of the steering column located on a rearward side relative to the instrument panel, wherein the steering column is adapted to be displaced in a frontward direction of the vehicle in response to an impact load applied thereto in the frontward direction, and the column cover is disposed to overlap with the meter unit when viewed in an axial direction of the steering column, and wherein the meter unit is attached to the instrument panel through a brittle portion in such a manner as to allow the attachment therebetween to be released when the column cover is brought into contact with the meter unit.

The present invention is intended to achieve the above object by positively utilizing the interference between the meter unit and the column cover, instead of avoiding the interference therebetween. Specifically, when the steering column is displaced frontwardly by an impact load applied thereto frontwardly, and the column cover is brought into contact with the meter unit, the attachment between the meter unit and the instrument panel is released by the brittle portion, to allow the column cover to be displaced in the frontward direction of the vehicle while pushing away the meter unit, even after the interference. This makes it possible to sufficiently ensure an amount of frontward displacement of the steering column, even under the condition that the column cover is disposed to overlap with the meter unit when viewed in the axial direction of the steering column.

These and other objects, features and advantages of the invention will become apparent upon reading the following detailed description along with the accompanying drawings.

DESCRIPTION OF THE PREFERRED EMBODIMENTS

First Embodiment

A structure of a vehicle instrument panel area according to a first embodiment of the present invention will now be described.

Figure 1:
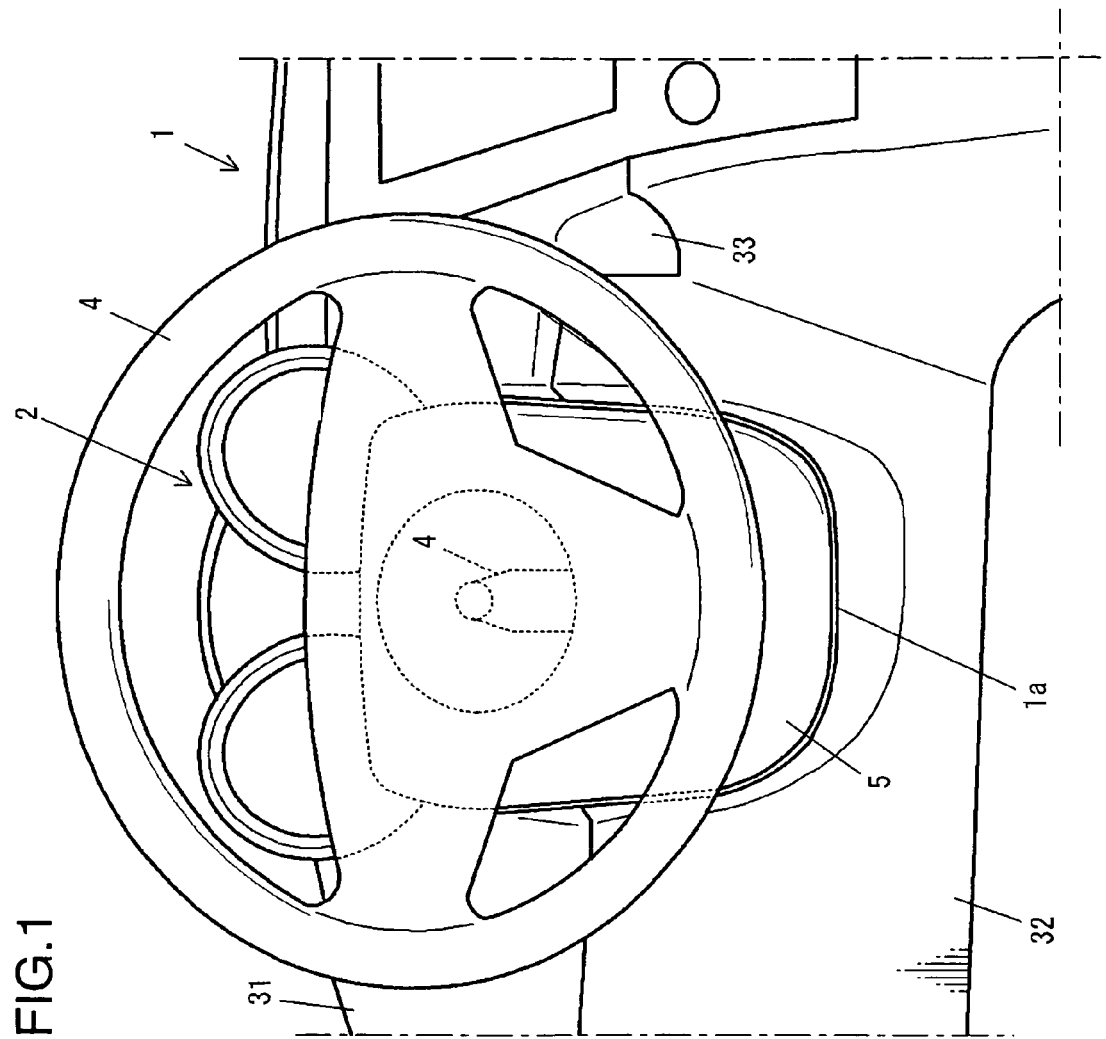
FIG. 1 is a front view showing a structure of a vehicle instrument panel area (in front of a driver seat), according to a first embodiment of the present invention.
Figure 2:
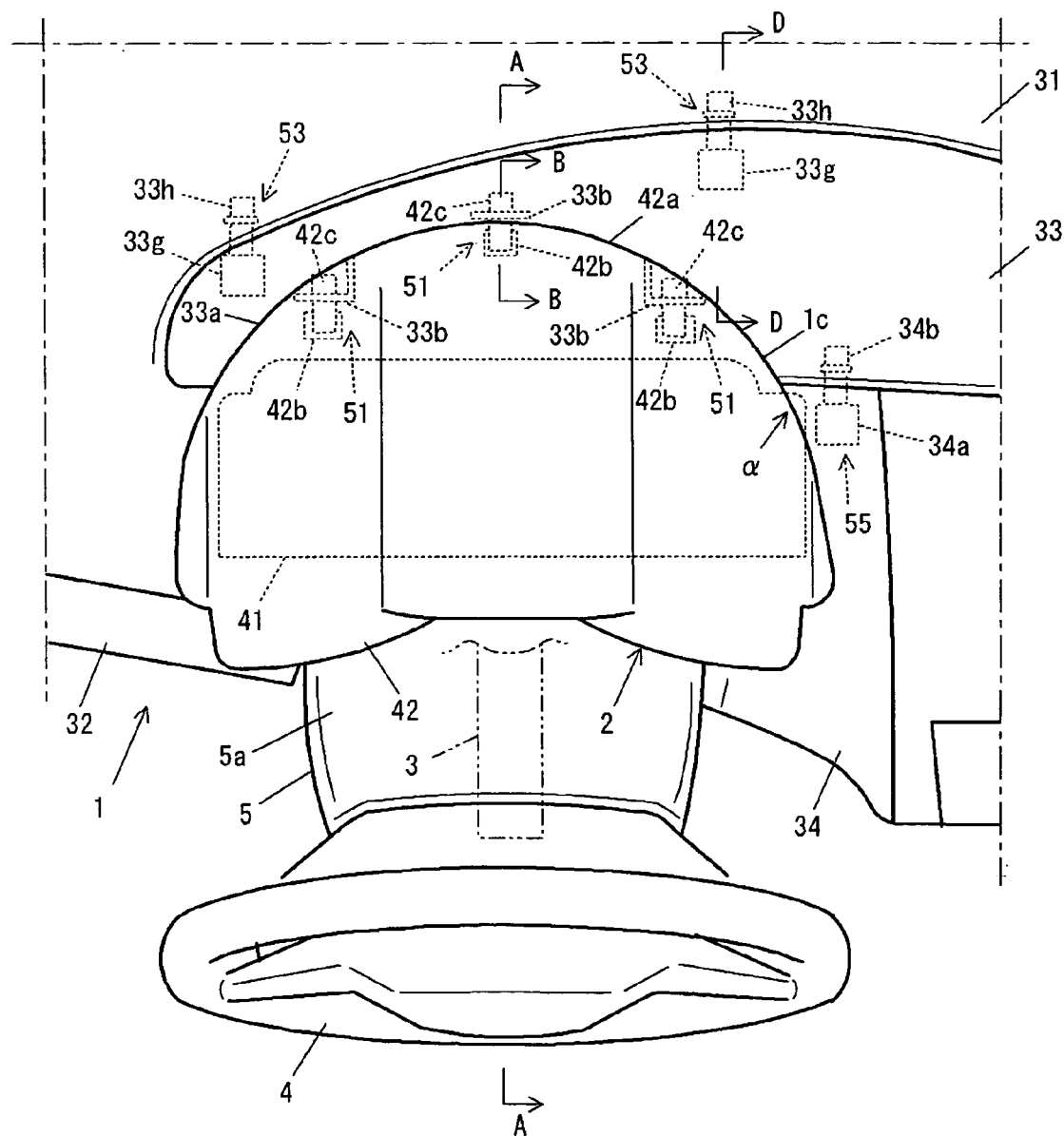
FIG. 2 is a top plan view showing the instrument panel structure in FIG. 1.
Figure 3:
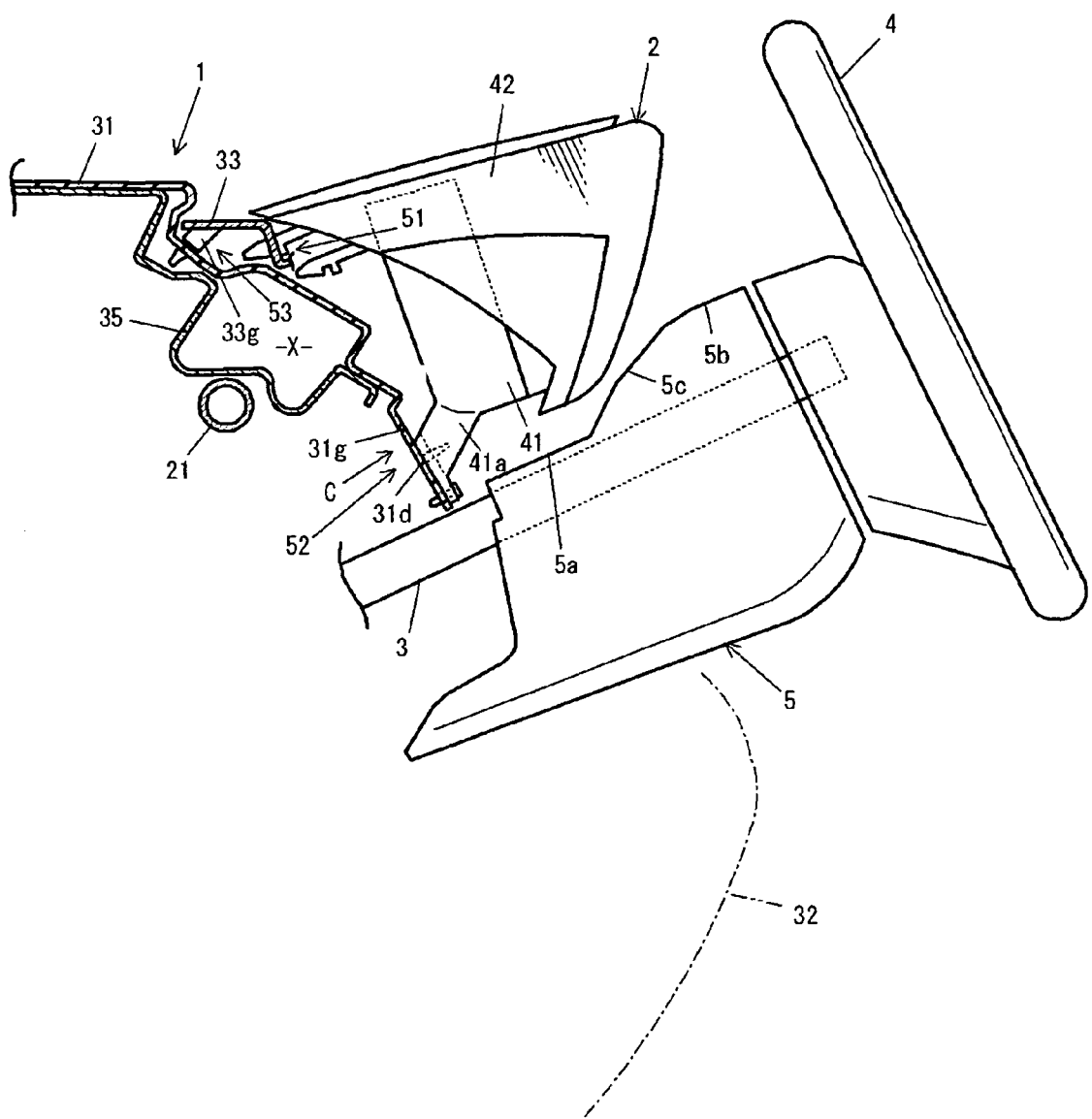
FIG. 3 is a sectional view taken along the line A-A in FIG. 2, wherein a cross-sectional position is partly displaced in order to show an attaching section 52 etc.

FIG. 1 is a front view showing a structure of a vehicle instrument panel area (specifically, in front of a driver seat), according to the first embodiment. FIG. 2 is a top plan view showing the instrument panel structure, and FIG. 3 is a sectional view taken along the line A-A in FIG. 2. Although the first embodiment will be described based on a vehicle with a left-hand steering wheel, it is understood that the present invention may be applied to a vehicle with a right-hand steering wheel.

As shown in FIGS. 1 to 3, in the vehicle instrument panel area in front of the driver seat, an instrument panel 1 is provided with a meter unit 2. A steering column 3 is arranged to penetrate through the instrument panel 1 and extend in a rearward direction of the vehicle, and a steering wheel 4 is attached to an interior-side end of the steering column 3. Further, a column cover 5 is attached to a portion of the steering column 3 located on a rearward side relative to the instrument panel 1.

Figure 4:
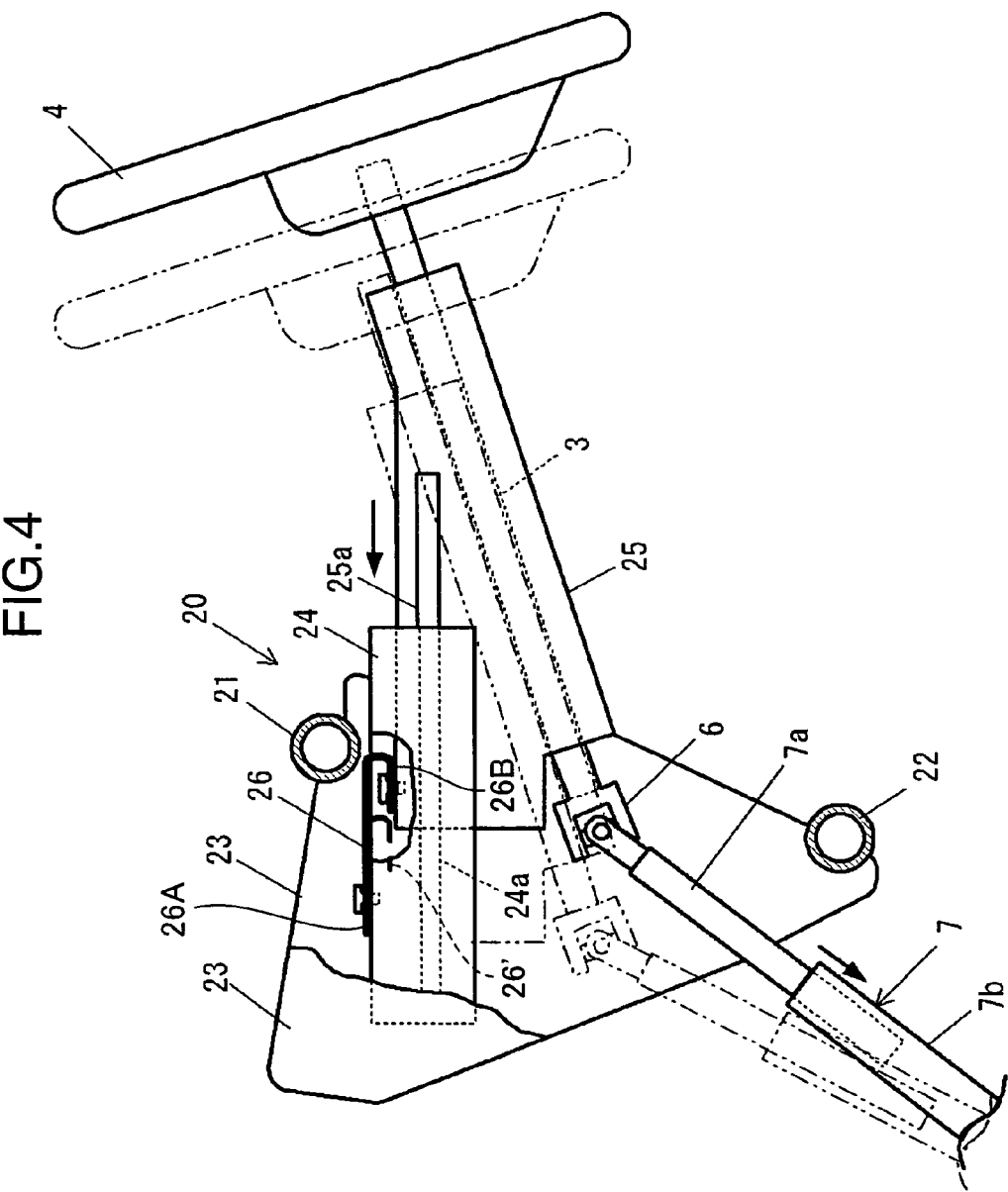
FIG. 4 is a schematic side view showing a steering support mechanism.

As shown in FIG. 4, the steering column 3 is positioned to incline downwardly toward a front portion thereof, and a front end (lower end) of the steering column 3 is connected to a coupling shaft 7 through a universal joint 6. The coupling shaft 7 has a lower end connected to a link mechanism through a gear mechanism (not shown). The coupling shaft 7 comprises a first member 7a and a second member 7b which are in fitted relation to each other in a longitudinally slidable manner.

An assembly of the steering column 3, and the steering wheel 4 and the column cover 5 which are attached to the steering column 3 (this assembly will hereinafter be referred to as "steering mechanism 10" on a case-by-case basis), is supported by a steering support mechanism 20, in such a manner that it can be displaced approximately horizontally in a frontward direction of the vehicle when an impact load is applied to the steering wheel 4 in the frontward direction.

The steering support mechanism 20 comprises: a pair of upper and lower instrument panel members (upper and lower pipe-like members) 21, 22 disposed in spaced-apart relation to each other in an upward-downward direction to extend in a widthwise (i.e., lateral) direction of the vehicle and between right and left walls of a vehicle body; a pair of right and left brackets 23, 23 each having upper and lower ends fixed to the respective pipe-like members 21, 22; a pair of rail members 24, 24 attached to respective upper portions of the right and left brackets 23, 23 to extend in a frontward-rearward (i.e., longitudinal) direction of the vehicle, and formed, respectively, with two grooves 24a, 24a opposed to each other; a column casing 25 receiving therein the steering column 3 while being supported by the rail members 24, 24 in a longitudinally slidable manner, through two longitudinally-extending convex portions 25a, 25a formed along respective right and left edges thereof and adapted to be fitted into the respective grooves 24a, 24a of the rail members 24, 24; and a connection member 26 which connects each of the right and left rail members 24, 24 to the column casing 25.

The connection member 26 is made up, for example, of an iron plate having a given thickness. The connection member 26 has right and left lateral ends 26A, 26A fixed to respective top surfaces of front portions of the right and left rail members 24, 24, and a bended portion 26B formed to have a J shape in a side view (as illustrated in FIG. 4) and a narrow width in top plan view, and fixed to an upper surface of a front portion of the column casing 25. Specifically, the bended portion 26B is formed to be deformable by a load applied thereto in the frontward direction of the vehicle, so that, when a given amount or more of load is applied to the steering wheel 4 in the frontward direction of the vehicle, the bended portion 26B is deformed as indicated by the broken line 26' while following a displacement of the column casing 25, and thereby the steering column 3 is displaced approximately horizontally in the frontward direction of the vehicle along the rail members 24, 24 while maintaining the inclined posture thereof.

A structure of the instrument panel 1 will be described below. As shown in FIGS. 1 to 3 and 5, has an instrument panel body divided into an upper instrument panel body 31 and a lower instrument panel body 32, a first panel member 33 provided to extend in the lateral direction along a lower edge of an information unit-mounting recess 31a which is formed in the upper instrument panel body 31 to extend in the lateral direction above the meter unit and on a frontward side relative to the meter unit 2, and a second panel member 34 provided on a lateral side of a center console adapted to allow an audio unit or the like to be attached thereto.

Each of the instrument panel upper and lower bodies 31, 32 is fixed to a corresponding one of the upper and lower pipe-like members 21, 22 at an appropriate position (not shown), and each of the first and second panel members 33, 34 are attached to the upper instrument panel body 31. Each of the instrument panel upper and lower bodies 31, 32 and the first and second panel members 33, 34 is made of a resin material.

Respective mating edges (i.e., lower and upper edges) of the instrument panel upper and lower bodies 31, 32 are formed to define a through-hole having a size allowing the column cover 5 to be displaced in the longitudinal direction.

Figure 5:
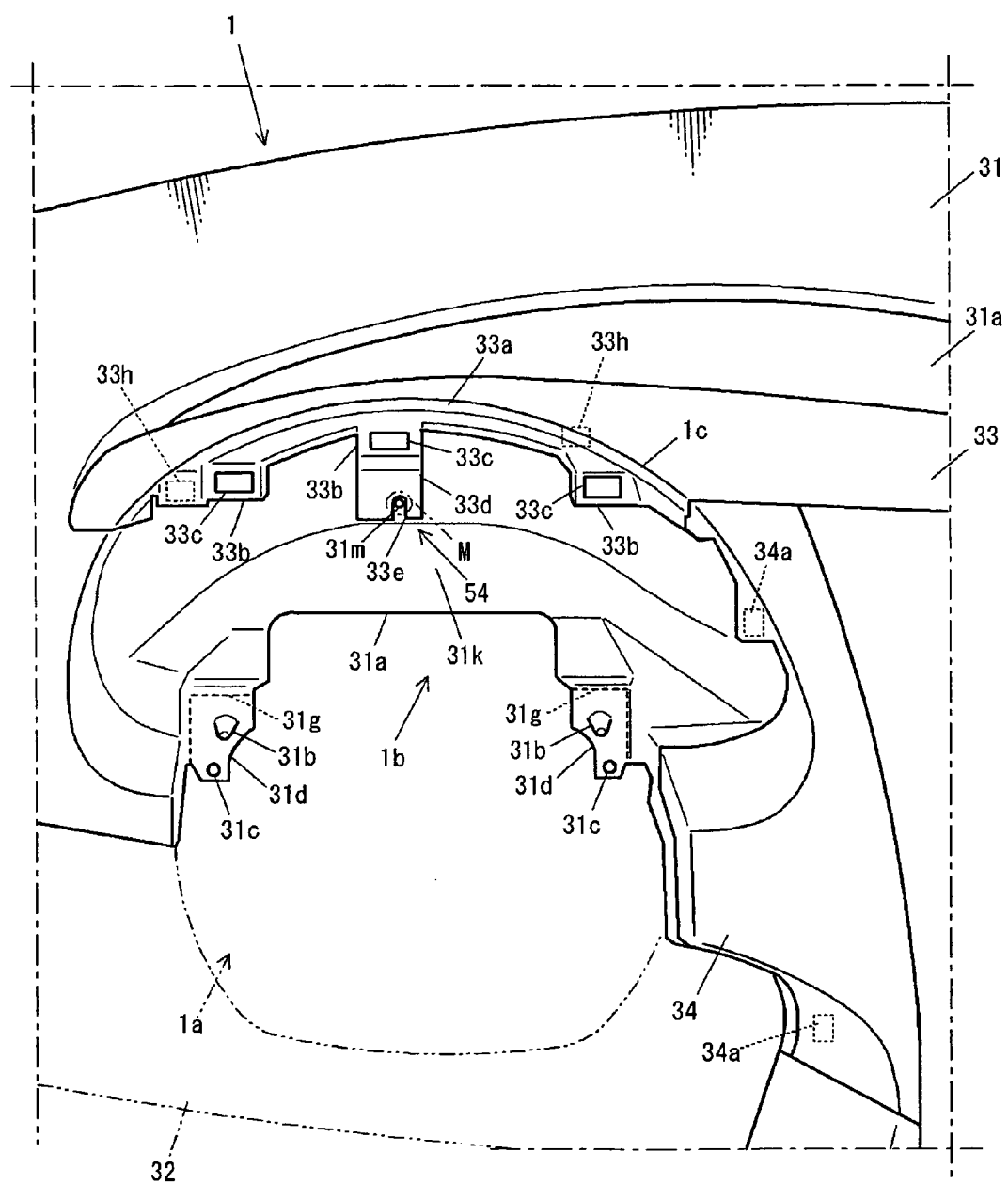
FIG. 5 is a front view independently showing an instrument panel in the instrument panel structure in FIG. 1, when viewed from a position located on a slightly obliquely upward side as compared with FIG. 1.

As shown in FIG. 5, the instrument panel upper and lower bodies 31, 32 and the first and second panel members 33, 34 constituting the instrument panel 1 are partly concaved in the frontward direction of the vehicle to form a meter unit-mounting recess 1b.

In FIG. 3, a panel member 35 provided on a frontward side relative to the upper instrument panel body 31 serves as a third panel member which defines a laterally-extending air-conditioning duct space X in cooperation with the upper instrument panel body 31.

As shown in FIGS. 2 and 3, the meter unit 2 comprises a meter body 41, and a generally fan-shaped hood 42 covering the meter body 41 from thereabove. The meter unit 2 has an upper portion attached to the first panel member 33 through an upper attaching section 51, and a lower portion attached to the upper instrument panel body 31 through a lower attaching section 52.

Figure 6:
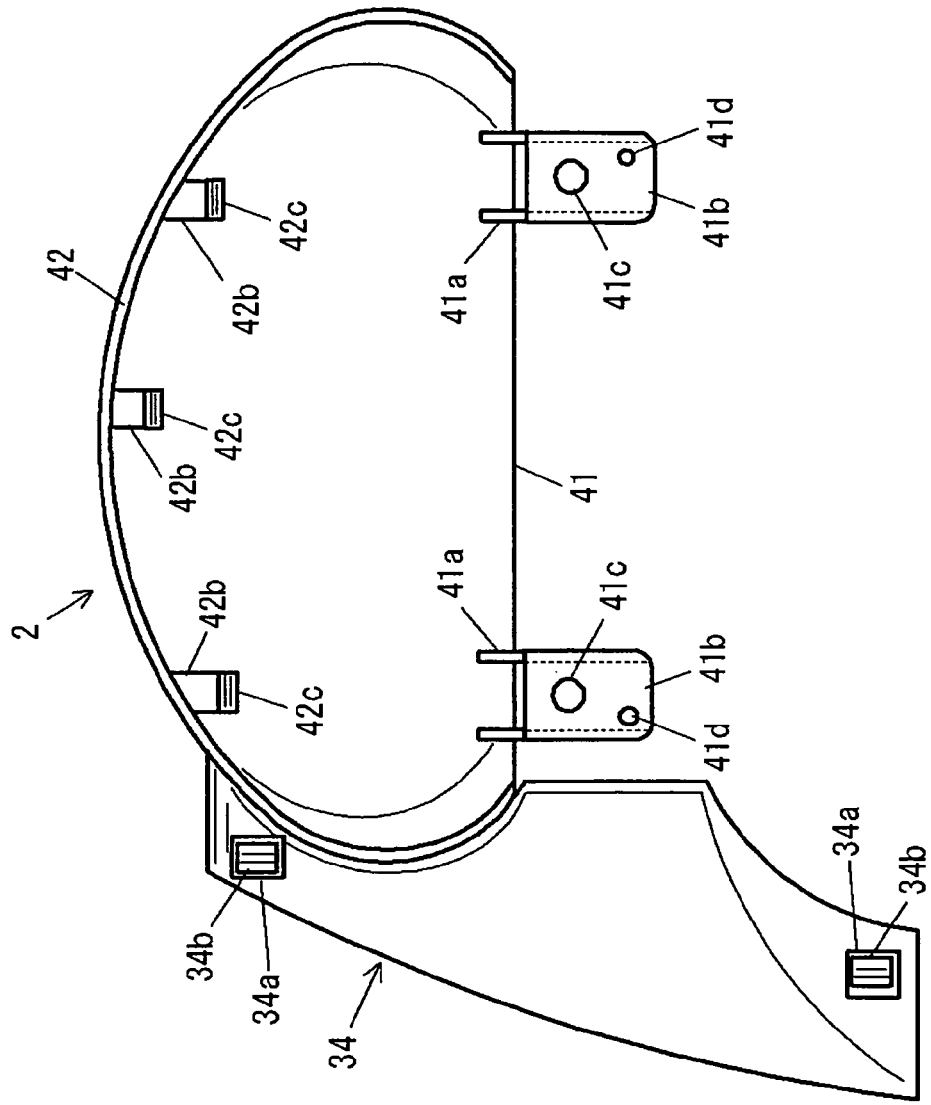
FIG. 6 is a back view showing a meter unit and a second panel member in the instrument panel structure in FIG. 1.
Figure 7:
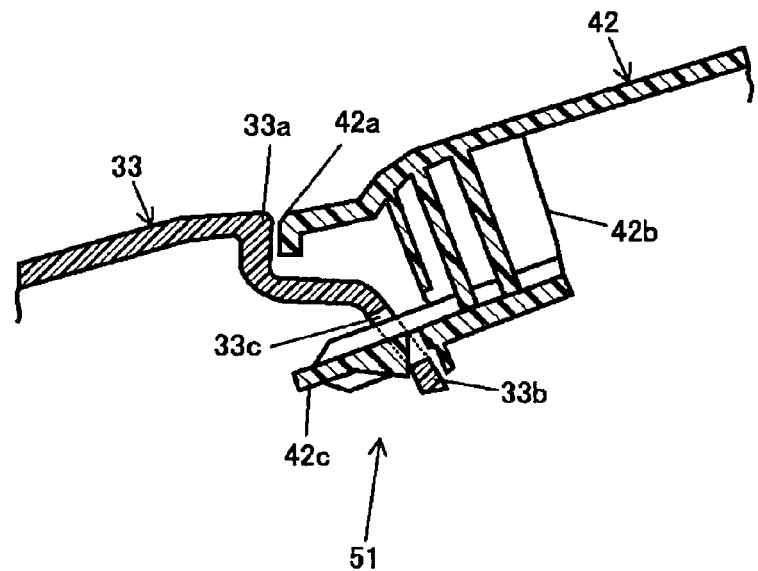
FIG. 7 is sectional view taken along the line B-B in FIG. 2.

Specifically, as seen in FIG. 2, the upper attaching section 51 includes three upper attaching sections disposed in spaced-apart relation to each other in the lateral direction of the vehicle. As shown in FIGS. 6 and 7, each of the upper attaching sections 51 has a meter unit-side element which comprises a support member 42a provided on a bottom surface of a rear edge region 42a of the hood 42 of the meter unit 2, and a clip 42c extending from the support member 42a in the frontward direction of the vehicle.

Further, as shown in FIGS. 5 and 7, each of the upper attaching sections 51 has a first panel member-side element which comprises a downward protrusion 33b provided to extend downwardly from an edge 33a defining an opening edge 1c of the meter unit-mounting recess 1b, at a position corresponding to the clip 42c, and a clip engagement hole 33c formed in the downward protrusion 33b. Thus, the upper portion of the meter unit 2 can be attached to the first panel member 33 by bringing each of the clips 42c, 42c, 42c of the meter unit-side element into engagement with a corresponding one of the clip engagement holes 33c, 33c, 33c of the first panel member-side element.

The lower attaching section 52 includes two lower attaching sections provided, respectively, on right and left sides of the meter body 41 of the meter unit 2 and the upper instrument panel body 31. Specifically, as shown in FIGS. 3, 6 and 8, each of the right and left lower attaching sections 52, 52 has a meter unit-side element which comprises a leg 41a extending obliquely frontwardly and downwardly from (right or left side of) a lower end of the meter body 41, an attachment surface member 41b provided to a lower end of the leg 41a, a positioning hole 41c formed in the attachment surface member 41b, and a screw hole 41d.

Figure 8:
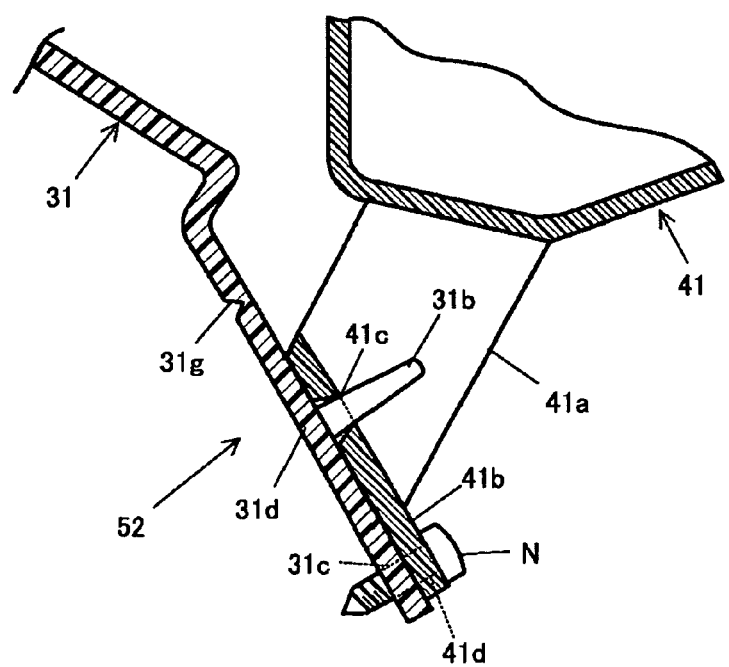
FIG. 8 is an enlarged view showing a region indicated by the arrow C in FIG. 3.

Further, as shown in FIGS. 3, 5 and 8, each of the right and left lower attaching sections 52, 52 has an upper instrument panel body-side element which comprises an attachment surface member 31d provided in a lower (right or left) end of a peripheral region of a cutout 31a defining a portion of the through-hole 1a formed in the upper instrument panel body 31, at a position corresponding to the attachment surface member 41b, a positioning pin 31b provided at a position corresponding to the positioning hole 41c, and a screw hole 31c provided at a position corresponding to the screw hole 41d.

Thus, the lower portion of the meter unit 2 can be attached to the upper instrument panel body 31 by bringing each of the positioning holes 41c, 41c of the meter unit-side element into engagement with a corresponding one of the positioning pins 31b, 31b of the upper instrument panel body-side element, and then screwing a screw N into each of the two sets of screw holes 31c, 41d. The screw hole 41d formed in the attachment surface member 41b may be a slit (not shown) formed to extend from a lower edge of the attachment surface member 41b.

Respective attachments of the first and second panel members 33, 34 to the upper instrument panel body 31 will be described below.

Firstly, the attachment of the first panel member 33 will be described. As shown in FIG. 3, the first panel member 33 is attached to the upper instrument panel body 31 through two types of attaching sections 53, 54 each having a different mechanism.

Figure 9:
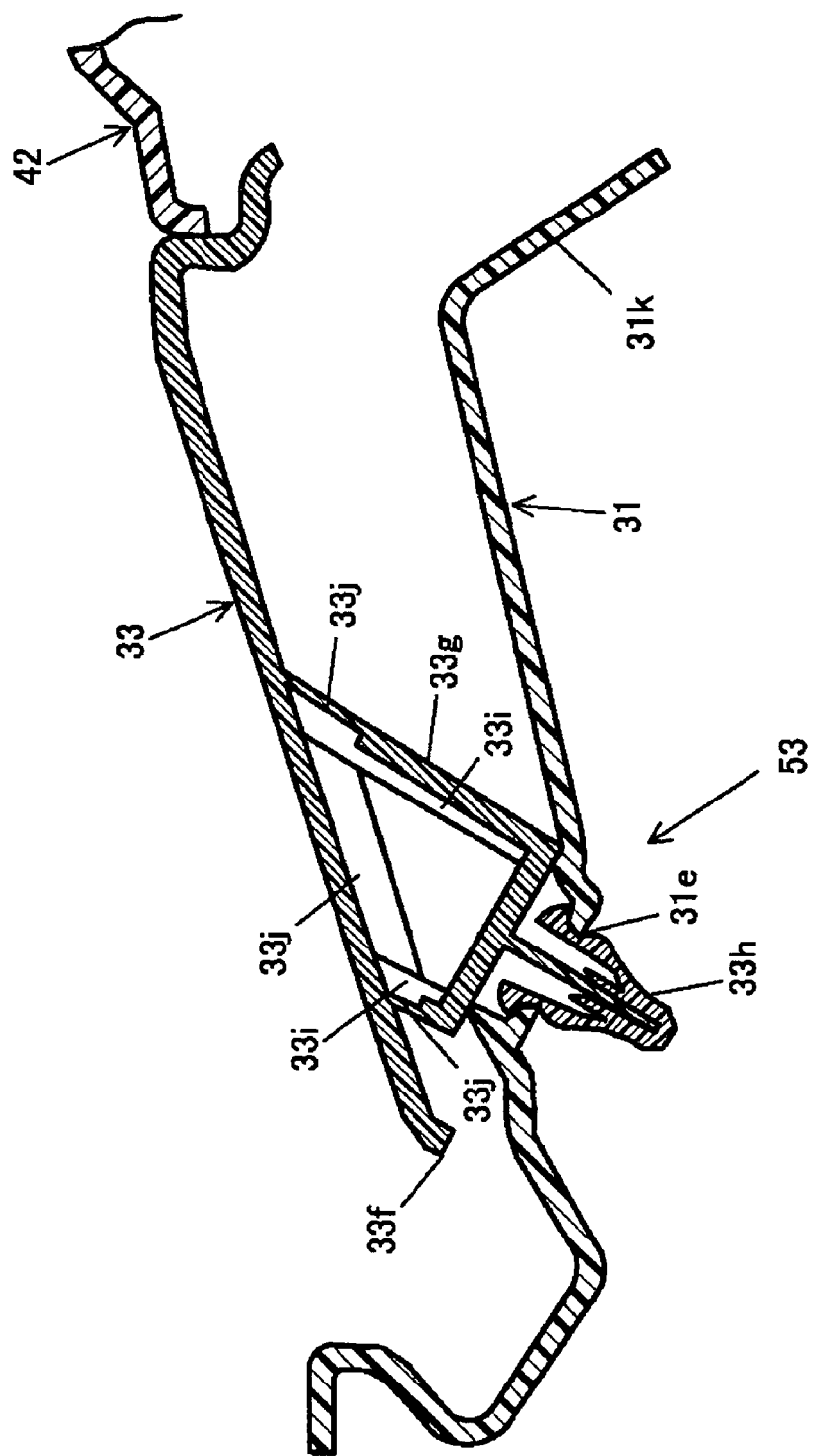
FIG. 9 is a sectional view taken along the line D-D in FIG. 2.

As seen in FIG. 2, the attaching section 53 includes a plurality of attaching sections disposed in spaced-apart relation to each other in the lateral direction of the vehicle (only two of them are shown in FIG. 2). As shown in FIGS. 3, 5 and 9, each of the attaching sections 53, - - -, 53 has a first panel member-side element which comprises a support member 33g provided on a bottom surface on the side of a front edge of the first panel member 33, and a clip 33h extending from the support member 33g in the frontward direction of the vehicle.

Further, each of the attaching sections 53, - - -, 53 has an upper instrument panel body-side element which comprises a clip engagement hole 31e formed in a rear wall 31k of the recess 1b at a position corresponding to the clip 33h. Thus, the first panel member 33 is attached to the upper instrument panel body 31 by bringing each of the clip 33h, - - -, 33h of the first panel member-side element into engagement with a corresponding one of the clip engagement holes 31e, - - -, 31e of the upper instrument panel body-side element.

As shown in FIG. 5, the attaching section 54 has a first panel member-side element which comprises a downward extension 33d extending downwardly from a laterally central one of the three downward protrusions 33b, and a slit 33e extending upwardly from a lower edge of the downward extension 33d.

Further, the attaching section 54 has an upper instrument panel body-side element which comprises a screw hole 31m formed in the rear wall 31k of the recess 1b at a position corresponding to an upper end of the slit 33e. Thus, the first panel member 33 is attached to the upper instrument panel body 31 by screwing a screw M into each of the slit 33e of the first panel member-side element and the screw hole 31m of the upper instrument panel body-side element. The slit 33e is formed to have a width slightly greater than a diameter of a threaded portion of the screw M.

Secondary, the attachment of the second panel member 34 will be described. As shown in FIGS. 2 and 5, the second panel member 34 is attached to the upper instrument panel body 31 through two attaching sections 55, 55 disposed, respectively, in upper and lower ends thereof in spaced-apart relation to each other.

Each of the attaching sections 55, 55 is mechanically the same as the attaching section 53. That is, the attaching section 55 has a second panel-side element comprising a support member 34a and a clip 34b, and an upper instrument panel body-side element comprising a clip engagement hole 31f (not shown).

Thus, the second panel is attached to the upper instrument panel body 31 by bringing each of the clips 34b of the second panel member-side element into engagement with a corresponding one of the clip engagement holes 31f (not shown) on the upper instrument panel body element.

As indicated by the arrow a, a portion of a laterally-inward end of a rear portion (with respect to a driver) of the meter body 41 protrudes inwardly from the hood 42, and the protruding portion is covered by an upper end (rear end) of the second panel member 34. This technique is employed in view of an aesthetic appearance of the hood 42, although it is technically easy to cover the protruding portion by enlarging the hood 42.

As seen in FIG. 1, in the first embodiment, the column cover 5 is disposed to overlap with the meter unit 2 in front view of the vehicle (which is approximately the same as a view when viewed in a displacement direction of the steering column 3, because the steering column 3 is adapted to be displaced approximately horizontally in the frontward direction of the vehicle). Thus, if the column cover 5 is displaced in the frontward direction of the vehicle, it will be brought into contact with the meter unit 2.

In the first embodiment, the instrument panel area structure is designed such that, even after the meter unit 2 is attached to the instrument panel 1, the attachment therebetween can be released to allow the steering mechanism 10 including the column cover 5 to be displaced in the frontward direction of the vehicle.

Specifically, as shown in FIGS. 3 and 8, in the lower attaching section 52 for attachment of the meter unit 2 to the lower portion of the upper instrument panel body 31, each of the attachment surface members 31d, 31d has a grooved portion 31g (brittle portion) formed in a periphery thereof. The grooved portion 31g is adapted to be broken by a given amount or more of longitudinal load applied thereto in response to the interference (contact) between the column cover 5 and the meter unit 2 during the frontward displacement of the column cover 5.

The support member 33g in each of the attaching sections 53 for attachment of the first panel member 33 to the upper instrument panel body 31 has the following structure. As shown in FIGS. 2, 3 and 9, the support member 33g has three walls 33h, 33h, 33h in orthogonal relation to each other, wherein a slit 33i is formed between adjacent ones of the walls 33h, 33h, 33h, and a thin-walled portion 33j is formed in an anchor end of each of the walls 33h, 33h, 33h.

Each of the thin-walled portions 33j, 33j, 33j is adapted to be broken according to a twisting motion of the walls 33h, 33h, 33h accelerated by the slits 33i, 33i, 33i when a given amount or more of longitudinal load is applied to the support member 33g in response to the interference between the column cover 5 and the meter unit 2 during the frontward displacement of the column cover 5. That is, the support members 33g, - - -, 33g serve as a brittle portion.

Respective wall thicknesses of the grooved portion 31g and the thin-walled portions 33j, 33j, 33j are set to allow the grooved portion 31g to be broken at an earlier timing than the thin-walled portions 33j, 33j, 33j when the column cover 5 is brought into contact with the meter unit 2 during the frontward displacement of the column cover 5.

Although not described in detail, the support member 34a in each of the attaching sections 55 for attachment of the second panel member 34 to the upper instrument panel body 31 has the same structure as that of the support member 33g in each of the attaching sections 53 for attachment of the first panel member 33 to the upper instrument panel body 31, i.e., has a thin-wall portion and a slit, wherein the thin-walled portion adapted to be broken when an impact force is applied to the second panel 34 upwardly. That is, the support portions 34a, 34a, 34a serve as a brittle portion.

As shown in FIG. 3, the column cover 5 has a top wall 5a which includes an upwardly raised portion 5b located on a rearward side relative to the meter unit 2 and adapted to allow various switches or the like to be arranged thereon, and an inclined portion 5c inclinedly extending from a front end of the upwardly raised portion 5b toward a position beneath the meter unit 2.

A function of the instrument panel area structure according to the first embodiment will be described below.

For example, in the event of a head-on collision of the vehicle, if an occupant secondarily collides with the steering wheel 4, an impact force is applied to the steering wheel 4 in the frontward direction of the vehicle, and, due to the impact load, the steering mechanism 10 will be displaced approximately horizontally in the frontward direction of the vehicle through the steering support mechanism 20.

Then, along with the frontward displacement, the column cover 5 is brought into contact with the lower portion of the meter unit 2. Then, if the steering mechanism 10 is forced to be further displaced in the frontward direction of the vehicle, a longitudinal shearing force is applied to the grooved portions 31g, 31g (brittle portion) in the attaching sections (lower attaching sections) 52 for attachment of the meter unit 2 to the upper instrument panel body 31, to cause breaking of the grooved portions 31g, 31g. Due to the breaking of the grooved portions 31g, 31g, the lower portion of the meter unit 2 becomes free to allow the column cover 5 to be displaced in the frontward direction of the vehicle while pushing away the lower portion of the meter unit 2 in the frontward direction of the vehicle. That is, the steering column 3 can be further displaced in the frontward direction of the vehicle.

Figure 10:
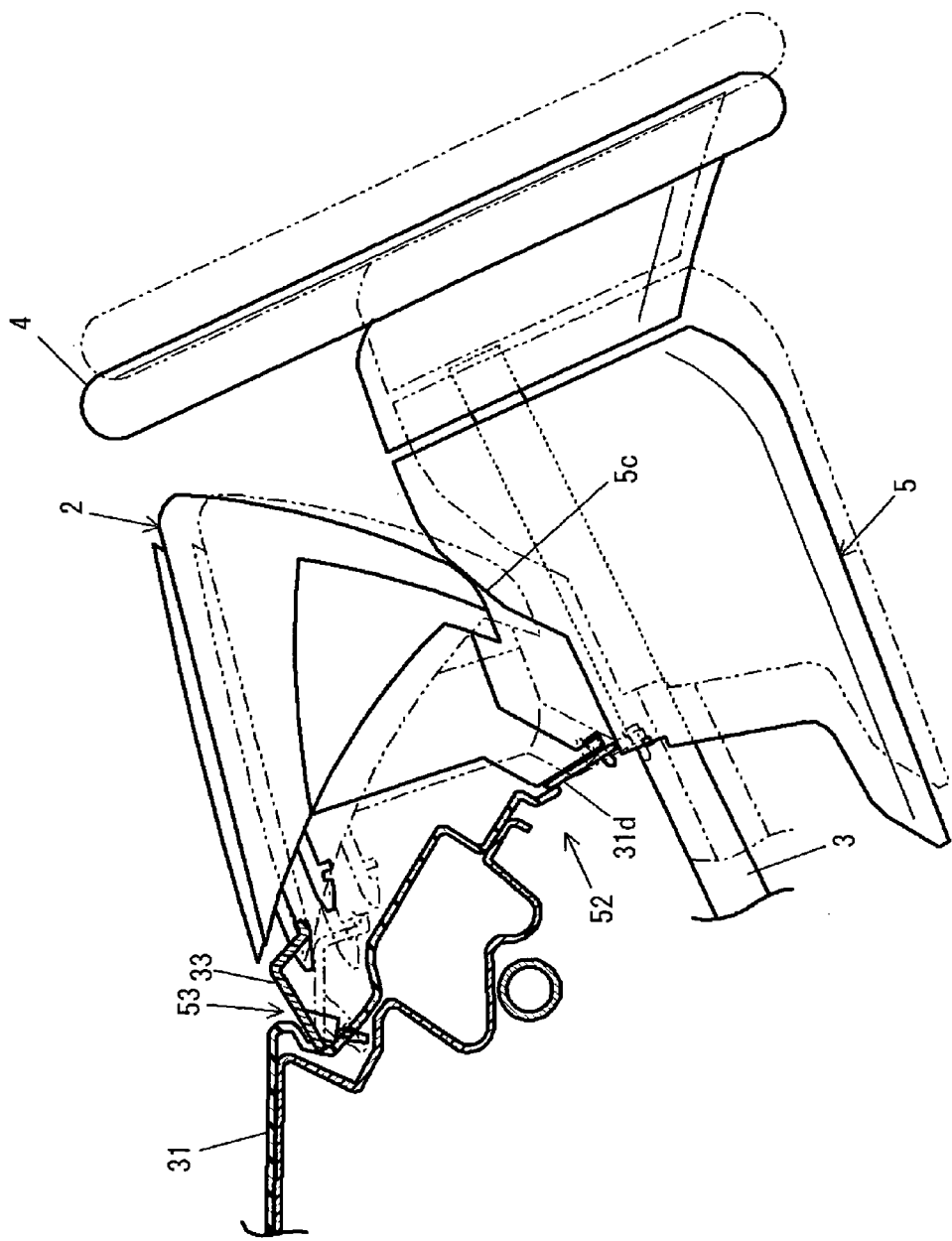
FIG. 10 is an explanatory diagram (I) showing a function/effect of the first embodiment.
Figure 11:
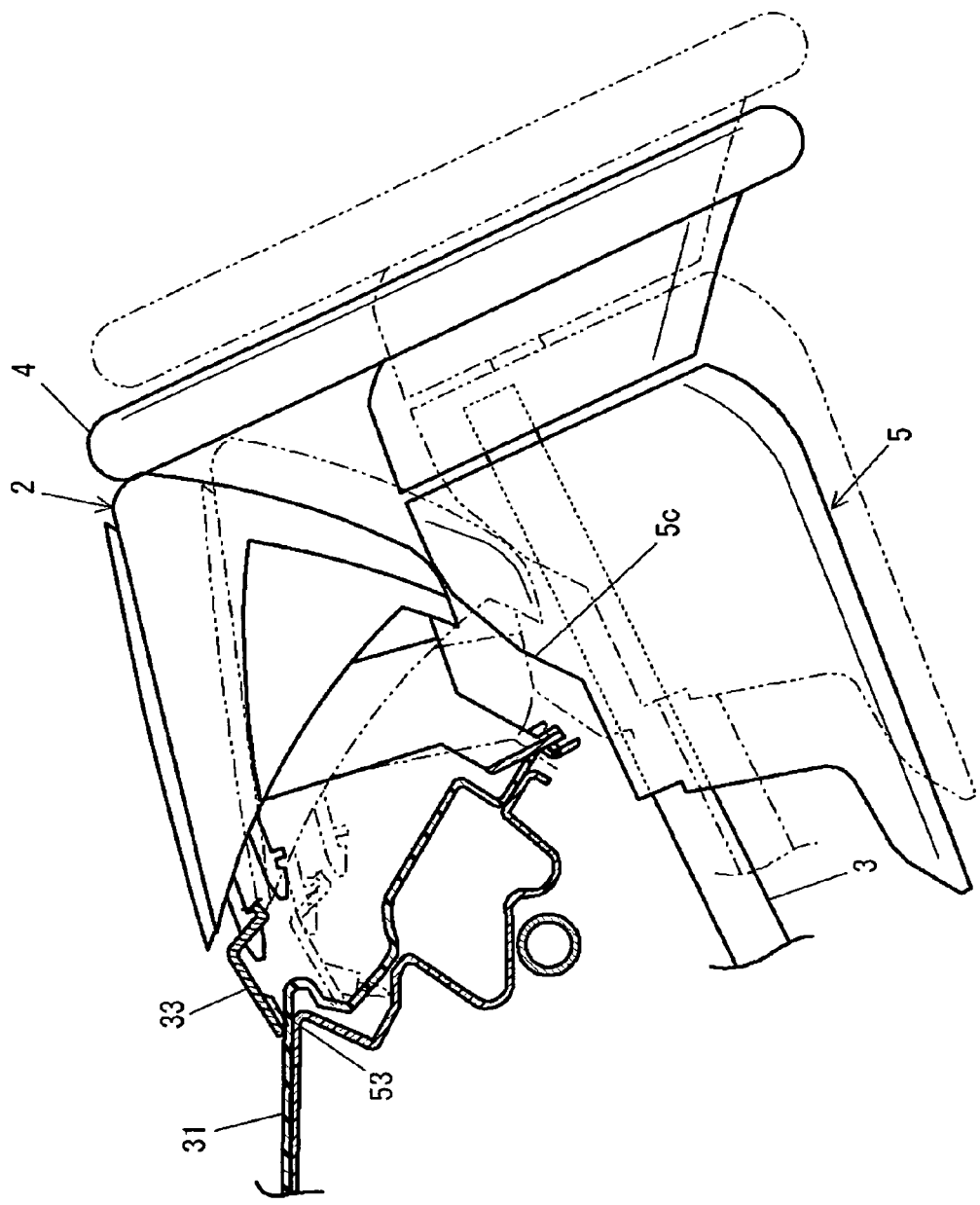
FIG. 11 is an explanatory diagram (II) showing a function/effect of the first embodiment

During the above frontward displacement, the support members 33g, - - -, 33g (brittle portion) in the attaching mechanisms 53 (upper attaching sections) for attachment of the first panel member 33 to the upper instrument panel body 31 have not been broken. Thus, as shown in FIG. 10, under a condition that the inclined portion 5c of the column cover 5 is in contact with the lower portion of the meter unit 2, a rear portion of the meter unit 2 is moved upwardly while being rotated about the upper portion of the meter unit 2. Further, a back surface of the meter unit 2 is brought into contact with the rear wall 31k of the recess 1b of the upper instrument panel body 31, and subsequently the meter unit 2 is displaced upwardly along the rear wall 31k.

In the attaching section 56 for attachment of the first panel member 33 to the upper instrument panel body 31, the slit 33e is formed in the downward extension 33d. Thus, during the above displacement, the screw M is relatively displaced downwardly along the slit 33e, and thereby the engagement between the screw M and the slit 3e is easily released to allow the attachment in the attaching section 54 to be released.

Then, when the meter unit 2 is displaced upwardly to a certain extent, an upward-downward sharing force is applied to the support members 33g, - - -, 33g (brittle portion) of the attaching sections (upper attaching sections) 53, and the thin-walled portions 33j, - - -, 33j of the support members 33g, - - -, 33g are finally broken. Thus, both the attachments in the upper and lower attaching sections of the meter unit 2 are released, so that both the upper and lower portions of the meter unit 2 become free to allow the column cover 5 to be displaced in the frontward direction of the vehicle while pushing the meter unit 2 upwardly. That is, the steering column 3 can be further displaced in the frontward direction of the vehicle.

When the meter unit 2 is further displaced upwardly, a laterally inward end of the rear portion of the meter body 41 is brought into confliction with the second panel member 34. At this timing, the attaching sections 55, 55 for attachment of the second panel member 24 to the upper instrument panel body 31 are broken. Thus, the meter unit 2 can be further displaced upwardly to allow the column cover 5 and the steering column 3 to be further displaced in the frontward direction of the vehicle.

The top wall 5a of the column cover 5 has the inclined portion 5c inclinedly extending from the front end of the upwardly raised portion 5b toward the position beneath the meter unit 2. Thus, even if the column cover 5 is brought into contact with the meter unit 2 during the frontward displacement, the lower portion of the meter unit 2 is displaced along a top surface of the inclined portion 5c. This makes it possible to prevent the frontward displacement from being hindered due to an undesirable situation where the column cover 5 becomes stuck in the meter unit 2.

Second Embodiment

A vehicle instrument panel area structure according to a second embodiment of the present invention will be described below.

In the second embodiment, the column cover 5 is disposed to overlap with the meter unit 2 in front view of the vehicle (which is approximately the same as the view when viewed in the displacement direction of the steering column 3, because the steering column 3 is adapted to be displaced approximately horizontally in the frontward direction of the vehicle), in the same manner as that in the first embodiment. Thus, if the column cover 5 is displaced in the frontward direction of the vehicle, it will be brought into contact with the meter unit 2. In the second embodiment, the instrument panel area structure is designed to push the meter unit 2 upwardly by utilizing a deformation of an impact-absorbing knee protector 60 adapted to absorb an impact load to be applied to an occupant, so as to reduce an interference between the meter unit 2 and the column cover 5 to allow the steering mechanism 1 to be displaced frontwardly.

Figure 12:
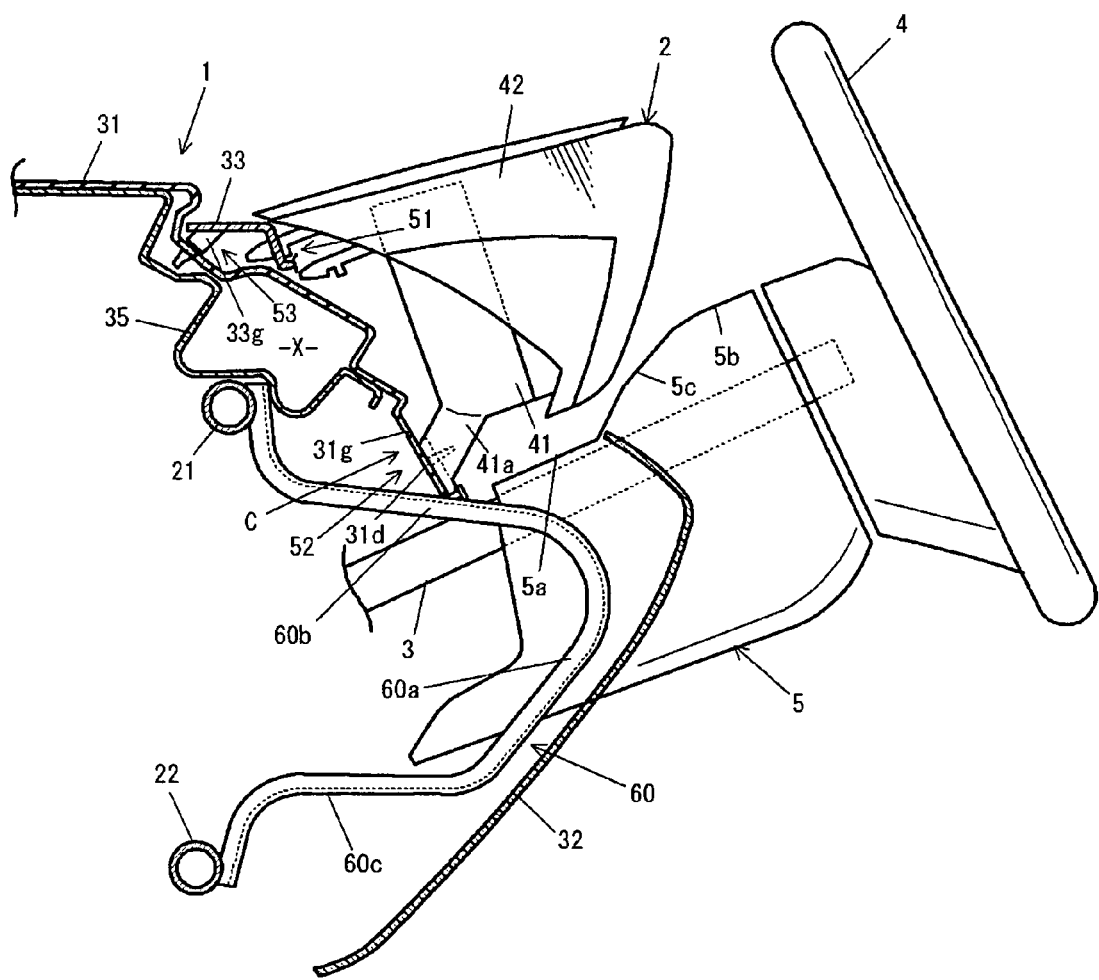
FIG. 12 is a sectional view showing a structure of a vehicle instrument panel area, according to a second embodiment of the present invention, which corresponds to the sectional view taken along the line A-A in FIG. 2, wherein a cross-sectional position is partly displaced in order to show an attaching section 52 etc.
Figure 13:
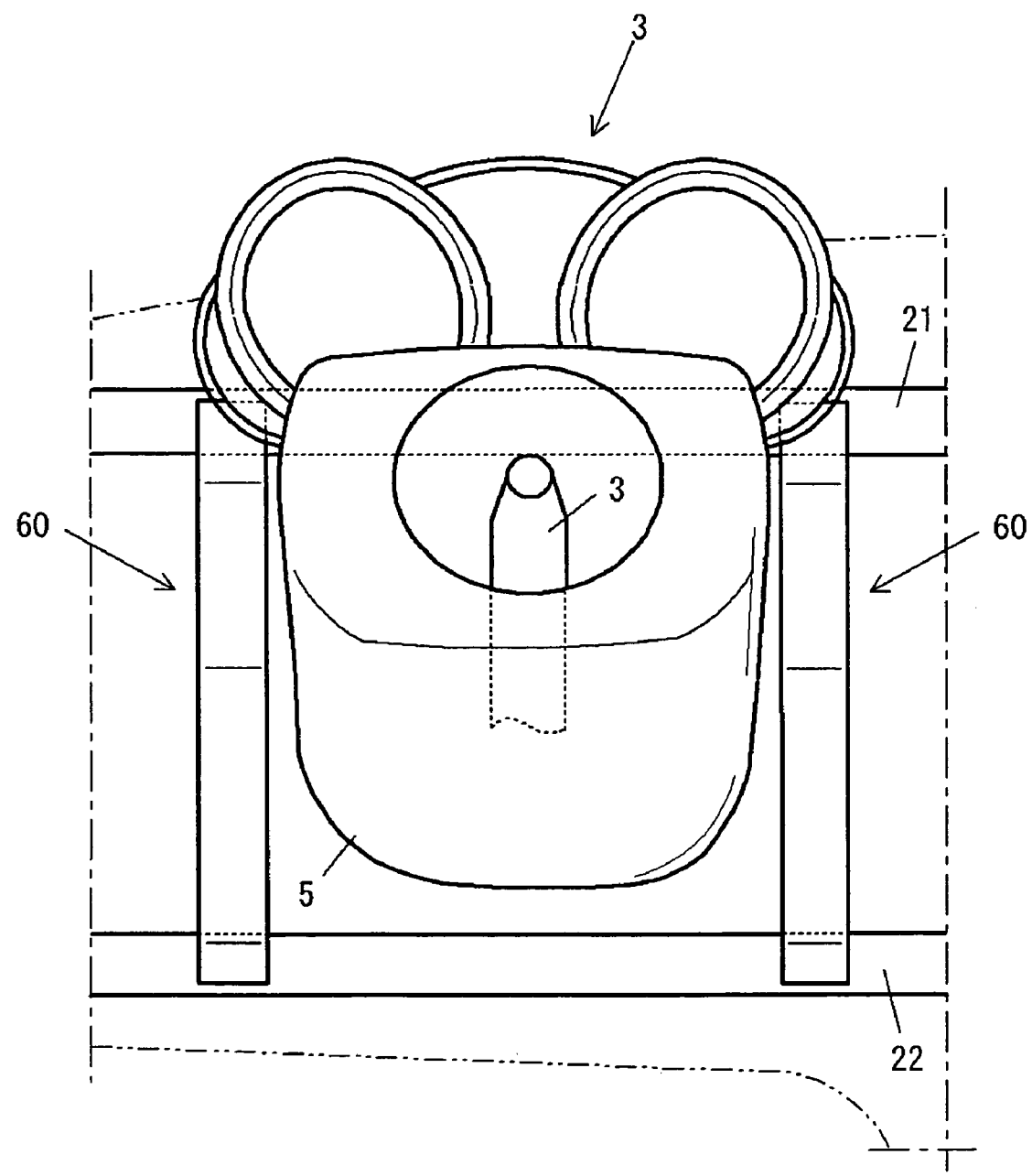
FIG. 13 is a front view showing the instrument panel area structure in FIG. 12, when seen through an instrument panel.

As shown in FIGS. 12 and 13, the knee protector 60 is formed and arranged to be located beneath a region between right and left ends of the meter unit 2, in such a manner that it has a load receiving portion 60a extending in a generally upward-downward direction along an inner surface of (the lower body 32) of the instrument panel 1, an upper leg portion 60a extending from an upper end of the load receiving portion 60a to have a distal end attached to an upper pipe-like member (upper instrument panel member) 21, and a lower leg portion 60c extending from a lower end of the load receiving portion 60a to have a distal end attached to the lower pipe-like member (lower instrument panel member) 22.

The load receiving member 60a is formed and arranged to extend rearwardly and obliquely upwardly, and the upper and lower ends of the knee protector 60 are fixed to two points, i.e., the upper and lower pipe-like members 21, 22, respectively. Thus, when the knee protector 60 receives a load from a knee of an occupant in the frontward direction of the vehicle, an upward displacement force is generated to deform the load receiving member 60a to protrude upwardly together the lower (i.e., rear) end of the upper leg portion 60b.

With a view to facilitating push-up of the meter unit 2 based on the protruding deformation of the knee protector 60, the meter unit 2 is designed to be attached to the instrument panel 1 through a brittle portion in a releasable manner.

For example, in the event of a head-on collision of the vehicle, a lower body of an occupant will be displaced in the frontward direction of the vehicle by an inertia force, although an upper body of the occupant is restrained by a seat belt. Then, when the occupant's knee is brought into contact with the load receiving portion 60a of the knee protector 60 through the lower instrument panel body 32, the knee protector 60 starts being deformed to protrude upwardly.

Figure 14:
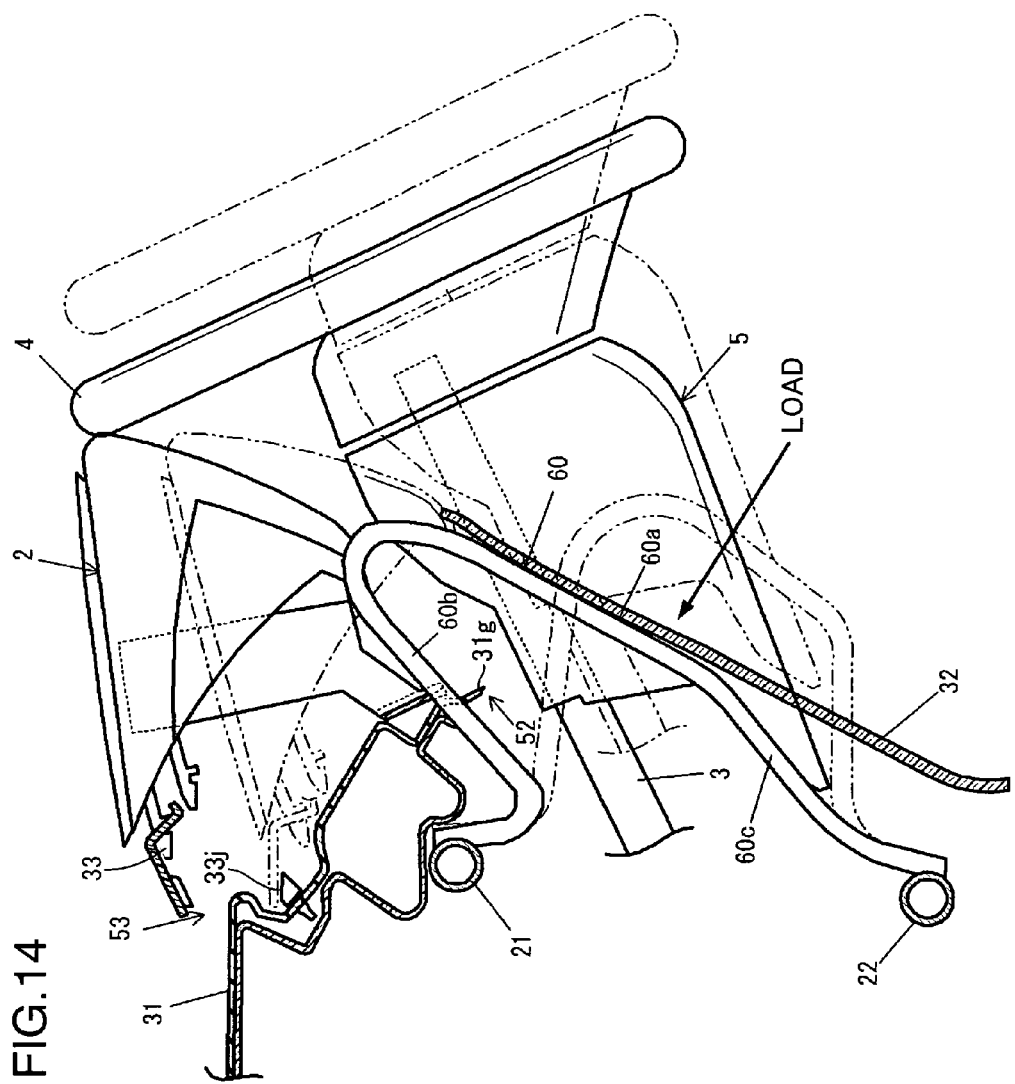
FIG. 14 is an explanatory diagram showing a function/effect of the second embodiment.

During the deformation, when the knee protector 60 is brought into contact with the lower portion of the meter unit 2 through a component beneath the meter unit 2 (FIGS. 12 and 14 are sectional views corresponding to the sectional view taken along the line A-A in FIG. 2 showing the first embodiment. Therefore, a lower portion of the upper instrument panel body 31 does not appear. In FIGS. 12 and 14, a portion of the knee protector 60 slightly deviating from the line A-A is also shown for purposes of illustration), a push-up force is applied to the meter unit 2 to apply to the support members (brittle portion) 31g, - - -, 31g of the upper and lower attaching sections 53, 52 a force causing breaking thereof.

During this process, a rear end of an upper portion of the meter unit 2 is displaced in a direction causing the rear end to be spaced apart upwardly from the upper instrument panel body 31. Thus, a shearing force is generated in the upper attaching section 53 at a higher level that that in the lower attaching section 52 to cause breaking of the support members (brittle portion) 31g, - - -, 31g, of the upper attaching sections 53.

As shown in FIG. 5, the vertical surface 31k exists in the recess 1b of the upper instrument panel body 31. Thus, the meter unit 2 will be displaced upwardly while leaning against a rear region of the vertical surface 31k. This displacement allows the steering column 3 to be further displaced in the frontward direction of the vehicle.

In the attaching section 54 for attachment of the first panel member 33 to the upper instrument panel body 31, the downward extension 33d is formed with the slit 33e. Thus, during the above displacement, the screw M is relatively displaced downwardly along the slit 33e, and thereby the engagement between the screw M and the slit 3e is easily released to allow the attachment in the attaching section 54 to be released.

When the meter unit 2 is further displaced upwardly, a laterally inward end of the rear portion (with respect to a driver) of the meter body 41 is brought into confliction with the second panel member 34. At this timing, the support members 34a, 34a of the attaching sections 55, 55 are broken, in the same manner as that in the attaching sections 53. Thus, the meter unit 2 can be further displaced upwardly while pushing the second panel member 34 upwardly.

Then, the occupant's upper body is displaced frontwardly against the restraint of the seat belt, and brought into collision with the steering wheel 4. Thus, due to a resulting frontward load, the steering mechanism 10 is displaced approximately horizontally in the frontward direction of the vehicle according to the steering support mechanism 20. During the frontward displacement, the meter unit 2 has already been pushed upwardly. Thus, as compared with a situation where the meter unit 2 has not be pushed upwardly, a risk of interference between the column cover 5 and the meter unit 2 can be reduced to facilitate the frontward displacement of the steering column 3.

For example, if the column cover 5 is brought into contact with the lower portion of the meter unit 2 during the frontward displacement of the column cover 5, a longitudinal shearing force is applied to the brittle portion (grooved portion) 31g of the lower attaching section 52 to cause breaking of the brittle portion (grooved portion) 31g, so that the lower portion of the meter unit 2 becomes free to allow the column cover 5 to be easily displaced in the frontward direction of the vehicle while pushing away the lower portion of the meter unit 2 upwardly. That is, the steering column 3 can be further displaced in the frontward direction of the vehicle.

As above, in the instrument panel area structure according to the second embodiment, the knee protector 60 is supported relative to the vehicle body. Thus, when a knee of an occupant is brought into contact with the knee protector 60 according to an impact load, the knee protector 60 can reliably receive a load applied thereto. In addition, the knee protector 60 can be deformed to protrude upwardly to adequately absorb impact energy.

Then, the meter unit 2 is pushed upwardly in conjunction with the upwardly protruding deformation of the knee protector 60, to reduce the interference between the column cover 5 and the meter unit 2 during the frontward displacement of the column cover 5. This makes it possible to sufficiently ensure an amount of frontward displacement of the steering column 3.

As mentioned above, the instrument panel area structure according to the above embodiments, particularly the first embodiment, is intended to achieve the object by positively utilizing the interference between the meter unit 2 and the column cover 5, instead of avoiding the interference therebetween. Specifically, when the steering column 3 is displaced frontwardly by an impact load applied thereto frontwardly, and the column cover 5 is brought into contact with the meter unit 2, the attachment between the meter unit 2 and the instrument panel 1 is released by the brittle portion (31g, 31g, 33g, - - -, 33g), to allow the column cover 5 to be displaced in the frontward direction of the vehicle while pushing away the meter unit 2, even after the interference.

This makes it possible to sufficiently ensure the frontward displacement of the steering column 3, even under the condition that the column cover 5 is disposed to overlap with the meter unit 2 when viewed in the displacement direction of the steering column 3.

If the attachment in the upper attaching section 53 is released at an earlier timing that that in the lower attaching section 52 during the interference between the column cover 5 and the meter unit 2, the meter unit 2 becomes unstable and falls down toward surroundings after the release of the attachment in the upper attaching section 53, which is likely to hinder the frontward displacement of the column cover 5. In contrast, the instrument panel area structures according to the above embodiments are designed to release the attachment in the lower attaching section 52 at an earlier timing than that in the upper attaching section 53, so that the above problem can be avoided.

The instrument panel 1 in the above embodiments is provided with the first panel member 33 in connection with an installation of an information unit. In this case, the brittle portion can be provided in the attaching section 53 for attachment of the first panel member 33 to the upper instrument panel body 31, to allow the attachment of the upper portion of the meter unit 2 to the upper instrument panel body 31 to be adequately released. Further, the meter unit 2 is attached to the upper instrument panel body 31 through the first panel member 33. This makes it possible to appropriately lower attaching strength to facilitate the upward displacement of the meter unit 2.

In the above embodiments, the brittle portion is provided in the attaching section 55 for attachment of the second panel 34 to the upper instrument panel body 31. Thus, if the meter body 41 protrudes outside the hood 42 of the meter unit 2 in top plan view, in view of an aesthetic appearance of the hood 42, as in the above embodiments, the attachment in the attaching section 55 for the second panel 2 can be released when the meter unit 2 is brought into contact with the second panel member 34 during the upward displacement thereof, to allow the second panel 34 to be displaced upwardly together with the meter unit 2. That is, even under a condition that a part of the meter unit 2 is covered by a panel member of the instrument panel 1 from thereabove, for design reasons, structural reasons or assembling reasons, the intended effects of the present invention can be obtained.

In the above embodiment, in the attachment of the upper portion of the meter unit 2, the brittle portion is provided in the attaching section 53. Alternatively, the brittle portion may be provided in the attaching section 51, or may be provided in both the attaching sections 51, 53.

In the above embodiments, the thin-walled portion and the slit are provided in each of the support members 34*a*, 34*a* of the attaching section 55. Alternatively, the thin-walled portion and the slit may be provided only in the upper support member 34*a*. Even in this case, an upper portion of the second panel can be displaced upwardly to achieve the object of the present invention.

The present invention can be widely used in a structure of a vehicle instrument panel area where a steering column is adapted to be displaced in a frontward direction of the vehicle in response to an impact load applied thereto, and a steering cover is disposed to overlap with a meter unit when viewed in a displacement direction of the steering column.

The present invention may be summarized as follows.

In the first aspect of the invention, the present invention relates to a structure of an instrument panel area of a vehicle, which comprises an instrument panel having a meter unit attached thereto, a steering column arranged to penetrate through a position below the meter unit attached to the instrument panel, and extend in a rearward direction of the vehicle, a column cover attached to a portion of the steering column located on a rearward side relative to the instrument panel, wherein the steering column is adapted to be displaced in a frontward direction of the vehicle in response to an impact load applied thereto in the frontward direction, and the column cover is disposed to overlap with the meter unit when viewed in a displacement direction of the steering column, and wherein the meter unit is attached to the instrument panel through a brittle portion in such a manner as to allow the attachment therebetween to be released when the column cover is brought into contact with the meter unit.

The present invention is intended to achieve the above object by positively utilizing the interference between the meter unit and the column cover, instead of avoiding the interference therebetween. Specifically, when the steering column is displaced frontwardly by an impact load applied thereto frontwardly, and the column cover is brought into contact with the meter unit, the attachment between the meter unit and the instrument panel is released by the brittle portion, to allow the column cover to be displaced in the frontward direction of the vehicle while pushing away the meter unit, even after the interference. This makes it possible to sufficiently ensure an amount of frontward displacement of the steering column, even under the condition that the column cover is disposed to overlap with the meter unit when viewed in the displacement direction of the steering column.

The column cover is designed to provide an upward raised portion in a top wall thereof in order to arrange various switches or the like thereon, in some cases. In this structure, when the column cover is brought into contact with the meter unit during the frontward movement thereof, the upwardly raised portion is likely to become stuck in the meter unit, and fail to further displace frontwardly.

Preferably, in the second aspect of the present invention, the column cover has a top wall formed with an upwardly raised portion, and an inclined portion inclinedly extending from a front end of the upwardly raised portion toward a position beneath the meter unit.

According to this feature, the inclined portion is provided in the top wall of the column cover to inclinedly extend from the front end of the upwardly raised portion toward a position beneath the meter unit. Thus, even if the column cover is brought into contact with the meter unit during the frontward displacement thereof, a lower portion of the meter unit will be displaced along a top surface of the inclined portion along with the frontward displacement of the inclined portion. This makes it possible to prevent the frontward displacement from being hindered due to an undesirable situation where the column cover becomes stuck in the meter unit.

Preferably, in the third aspect of the present invention, the structure of the present invention further comprises a knee protector disposed beneath the meter unit while being supported relative to a vehicle body, and designed such that, when a knee of an occupant hits thereagainst according to an impact load, it is deformed to protrude upwardly to absorb impact energy, wherein the knee protector is adapted to allow the meter unit to be pushed upwardly along with the protruding deformation so as to reduce the interference between the column cover and the meter unit during the frontward displacement of the column cover.

According to this feature, the knee protector is supported relative to the vehicle body. Thus, when a knee of an occupant is brought into contact with the knee protector according to an impact load, the knee protector can reliably receive a load applied thereto. In addition, the knee protector can be deformed to protrude upwardly to adequately absorb impact energy.

Preferably, in the 4th aspect of the present invention, the meter unit is attached to the instrument panel through an attaching section which includes an upper attaching section adapted to allow an upper portion of the meter unit to be attached to the instrument panel therethrough, and a lower attaching section adapted to allow a lower portion of the meter unit to be attached to the instrument panel therethrough, wherein the brittle portion is provided in each of the upper attaching section and the lower attaching section, in such a manner that, when the column cover is brought into contact with the meter unit, the attachment in the lower attaching section is released at an earlier timing than the attachment in the upper attaching section.

According to this feature, when the attaching section for attachment of the meter unit to the instrument panel includes the upper attaching section for attachment of the upper portion of the meter unit to the instrument panel, and the lower attaching section for attachment of the lower portion of the meter unit to the instrument panel, and the brittle portion is provided in each of the upper and lower attaching sections, the attachment in the lower attaching section is released at an earlier timing than the attachment in the upper attaching section when the column cover is brought into contact with the meter unit. If this relation is reversed, the meter unit becomes unstable and falls down toward surroundings after the release of the attachment in the upper attaching section, which is likely to hinder the frontward displacement of the column cover. The above structure can prevent this problem.

Preferably, in the 5th aspect o f the present invention, the lower attaching section is adapted to allow the attachment therein to be released by the brittle portion when a given amount or more of load is applied thereto in the frontward direction of the vehicle along with the interference between the column cover and the meter unit.

According to this feature, the brittle portion in the lower attaching section is adapted to allow the attachment therein to be released when a given amount or more of load is applied thereto in the frontward direction of the vehicle along with the interference between the column cover and the meter unit. This allows the lower portion of the meter unit to be rotated about the upper of the meter unit in response to the release. Thus, when the column cover is displaced frontwardly while maintaining the interference with the lower portion of the meter unit, the lower portion of the meter unit will be pushed away frontwardly to allow the steering column to be adequately displaced in the frontward direction of the vehicle.

When the attachment in the lower attaching section is released, the column cover is displaced beneath the meter unit while rotating the meter unit about the upper attaching section, along with the frontward displacement of the column cover, as mentioned above. For example, if the meter unit becomes unable to be further rotated due to interference with a rear obstacle, the column cover is likely to become unable to be further displaced frontwardly unless the meter unit is displaced upwardly.

Preferably, in the 6th aspect of the present invention, the upper attaching section is adapted to allow the attachment therein to be released by the brittle portion when a given amount or more of load is applied thereto upwardly along with the interference between the column cover and the meter unit.

According to this feature, the brittle portion in the lower attaching section is adapted to allow the attachment therein to be released when a given amount or more of load is applied thereto upwardly along with the interference between the column cover and the meter unit. This makes it possible to push the meter unit upwardly. Thus, even after the interference, the steering column can be adequately displaced in the frontward direction of the vehicle.

Preferably, in the 7th aspect of the present invention, the meter unit has an attaching piece which is provided in a lower portion thereof, and adapted to be fastened to the instrument panel using a screw to allow the meter unit to be attached to the instrument panel, wherein the attachment piece is formed with a slit extending upwardly from an lower edge thereof, in a position for allowing said screw to be inserted therein.

According to this feature, for example, the attachment piece provided in a lower portion of the meter unit is adapted to be fastened to the instrument panel using a screw to allow the meter unit to be attached to the instrument panel, and formed with a slit extending upwardly from an lower edge thereof, in a position for allowing said screw to be inserted therein. Thus, when the meter unit is displaced upwardly, the screw is relatively moved downwardly along the slit of the attachment piece, and finally disengaged from the slit. This means that the attachment to the instrument panel can be readily released during the upward displacement of the meter unit.

Preferably, in the 8th aspect of the present invention, the instrument panel has an instrument panel body, and a panel member adapted to be attached to the instrument panel body, wherein the meter unit is attached to the instrument panel body through the panel member, and the brittle portion is provided in at least one of an attaching section for attachment of the meter unit to the panel member, and an attaching section for attachment of the panel member to the instrument panel body.

According to this feature, the instrument panel has an instrument panel body, and a panel member adapted to be attached to the instrument panel body, wherein the meter unit is attached to the instrument panel body through the panel member, and the brittle portion is provided in at least one of an attaching section for attachment of the meter unit to the panel member, and an attaching section for attachment of the panel member to the instrument panel body. Thus, when either one of the brittle portions is broken during the interference between the column cover and the meter unit, the meter unit becomes displaceable relative to the instrument panel body. This makes it possible to obtain the functions/effects in the structure set forth in the 1st and 2nd aspects of the present invention, even in the structure using the separate panel. This also makes it possible to appropriately lower attaching strength to facilitate the upward displacement of the meter unit.

Preferably, in the 9th aspect of the present invention, at least part of the meter unit is covered by the instrument panel from thereabove, wherein the instrument panel includes an instrument panel body, and a separate panel member adapted to be separably attached to the instrument panel body and to cover a part of the meter unit, and the meter unit is adapted to be displaced upwardly according to the interference between the column cover and the meter unit, and wherein the separate panel member is attached to the instrument panel body through the brittle portion in such a manner as to allow the attachment therebetween to be released when the meter unit is brought into contact with the separate panel member during the upward displacement thereof.

According to this feature, when at least part of the meter unit is covered by the instrument panel from thereabove, wherein the instrument panel includes an instrument panel body, and a separate panel member adapted to be separably attached to the instrument panel body and to cover a part of the meter unit, and the meter unit is adapted to be displaced upwardly according to the interference between the column cover and the meter unit, the separate panel member is attached to the instrument panel body through the brittle portion in such a manner as to allow the attachment therebetween to be released when the meter unit is brought into contact with the separate panel member during the upward displacement thereof. Thus, when the meter unit is brought into contact with the separate panel member during the upward displacement thereof, the attachment in the attaching section for the separate panel member is released to allow the separate panel member to be displaced upwardly together with the meter unit. Therefore, even under a condition that a part of the meter unit is covered by the instrument panel from thereabove, for design reasons, structural reasons or assembling reasons, the function and effects in the structures set forth in the aforementioned $1^{st}$ and $2^{nd}$ aspects of the present invention can be obtained.

Preferably, in the $10^{th}$ aspect of the present invention, at least part of the meter unit is covered by the instrument panel from thereabove, wherein the instrument panel includes an instrument panel body, a first panel member adapted to be attached to the instrument panel body, and a second panel member adapted to be separably attached to the instrument panel body and to cover a part of the meter unit, and the meter unit is attached to the instrument panel body through the first panel member and adapted to be displaced upwardly according to the interference between the column cover and the meter unit, and wherein the brittle portion includes a first brittle portion provided in at least one of an attaching section for attachment of the meter unit to the first panel member, and an attaching section for attachment of the first panel member to the instrument panel body, and a second brittle portion provided in an attaching section for attachment of the second panel member to the instrument panel body, in such a manner as to allow the attachment therebetween to be released when the meter unit is brought into contact with the second panel member during the upward displacement thereof.

According to this feature, the functions and effects in the structures set forth in the $8^{th}$ and $9^{th}$ aspects of the present invention can be obtained as well as the functions and effects in the structures set forth in the $1^{st}$ and $2^{nd}$ aspects of the present invention.

This application is based on Japanese Patent Application Serial No. 2007-258208 and No. 2007-258210, filed in Japan Patent Office on Oct. 2, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A structure of an instrument panel area of a vehicle, comprising:
an instrument panel having a meter unit attached thereto;
a steering column arranged to penetrate through a position below said meter unit attached to said instrument panel, and extending in a rearward direction of the vehicle;
a column cover attached to a portion of said steering column located on a rearward side relative to said instrument panel,
wherein:
said steering column is adapted to be displaced in a frontward direction of the vehicle in response to an impact load applied thereto in the frontward direction;
said column cover is disposed to overlap with said meter unit when viewed in an axial direction of said steering column; and
said meter unit is attached to said instrument panel through a brittle portion in such a manner as to allow the attachment therebetween to be released when said column cover is brought into contact with said meter unit,
wherein said column cover has a top wall formed with an upwardly raised portion, and an inclined portion inclinedly extending from a front end of said upwardly raised portion toward a position beneath said meter unit,
wherein said meter unit is attached to said instrument panel through an attaching section which includes an upper attaching section adapted to allow an upper portion of said meter unit to be attached to said instrument panel therethrough, and a lower attaching section adapted to allow a lower portion of said meter unit to be attached to said instrument panel therethrough, wherein said brittle portion is provided in each of said upper attaching section and said lower attaching section, in such a manner that, when said column cover is brought into contact with said meter unit, said attachment in said lower attaching section is released at an earlier timing than said attachment in said upper attaching section.

2. The structure according to claim 1, wherein said lower attaching section is adapted to allow the attachment therein to be released by said brittle portion when a given amount or more of load is applied thereto in the frontward direction of the vehicle along with the interference between said column cover and said meter unit.

3. The structure according to claim 1, wherein said upper attaching section is adapted to allow the attachment therein to be released by said brittle portion when a given amount of load or more is applied thereto upwardly along with the interference between said column cover and said meter unit.

4. A structure of an instrument panel area of a vehicle, comprising:
an instrument panel having a meter unit attached thereto;
a steering column arranged to penetrate through a position below said meter unit attached to said instrument panel, and extending in a rearward direction of the vehicle;
a column cover attached to a portion of said steering column located on a rearward side relative to said instrument panel,
wherein:
said steering column is adapted to be displaced in a frontward direction of the vehicle in response to an impact load applied thereto in the frontward direction;
said column cover is disposed to overlap with said meter unit when viewed in an axial direction of said steering column; and
said meter unit is attached to said instrument panel through a brittle portion in such a manner as to allow the attachment therebetween to be released when said column cover is brought into contact with said meter unit
wherein said instrument panel has an instrument panel body, and a panel member adapted to be attached to said instrument panel body, wherein:
said meter unit is attached to said instrument panel body through said panel member; and
said brittle portion is provided in at least one of an attaching section for attachment of said meter unit to said panel member, and an attaching section for attachment of said panel member to said instrument panel body.

5. A structure of an instrument panel area of a vehicle, comprising:

an instrument panel having a meter unit attached thereto;

a steering column arranged to penetrate through a position below said meter unit attached to said instrument panel, and extending in a rearward direction of the vehicle;

a column cover attached to a portion of said steering column located on a rearward side relative to said instrument panel, wherein:

said steering column is adapted to be displaced in a frontward direction of the vehicle in response to an impact load applied thereto in the frontward direction;

said column cover is disposed to overlap with said meter unit when viewed in an axial direction of said steering column; and said meter unit is attached to said instrument panel through a brittle portion in such a manner as to allow the attachment therebetween to be released when said column cover is brought into contact with said meter unit wherein:

said instrument panel includes an instrument panel body, and a separate panel member adapted to be separably attached to said instrument panel body and to cover a part of said meter unit; and said meter unit is adapted to be displaced upwardly according to the interference between said column cover and said meter unit, wherein said separate panel member is attached to said instrument panel body through said brittle portion in such a manner as to allow the attachment therebetween to be released when said meter unit is brought into contact with said separate panel member during said upward displacement thereof.

6. A structure of an instrument panel area of a vehicle, comprising:

an instrument panel having a meter unit attached thereto;

a steering column arranged to penetrate through a position below said meter unit attached to said instrument panel, and extending in a rearward direction of the vehicle;

a column cover attached to a portion of said steering column located on a rearward side relative to said instrument panel, wherein:

said steering column is adapted to be displaced in a frontward direction of the vehicle in response to an impact load applied thereto in the frontward direction;

said column cover is disposed to overlap with said meter unit when viewed in an axial direction of said steering column; and said meter unit is attached to said instrument panel through a brittle portion in such a manner as to allow the attachment therebetween to be released when said column cover is brought into contact with said meter unit wherein:

said instrument panel includes an instrument panel body, a first panel member adapted to be attached to said instrument panel body, and a second panel member adapted to be separably attached to said instrument panel body and to cover a part of said meter unit; and said meter unit is attached to said instrument panel body through said first panel member, and adapted to be displaced upwardly according to the interference between said column cover and said meter unit, said brittle portion includes a first brittle portion provided in at least one of an attaching section for attachment of said meter unit to said first panel member, and an attaching section for attachment of said first panel member to said instrument panel body, and a second brittle portion provided in an attaching section for attachment of said second panel member to said instrument panel body, in such a manner as to allow the attachment therebetween to be released when said meter unit is brought into contact with said second panel member during said upward displacement thereof.

* * * * *